United States Patent
Song et al.

(10) Patent No.: US 11,549,036 B2
(45) Date of Patent: Jan. 10, 2023

(54) MULTI-LAYER ADHESIVE TAPE

(71) Applicant: Koza Novel Materials Korea Co., Ltd., Seoul (KR)

(72) Inventors: Hokyung Song, Daejeon (KR); Dong Hoon Lim, Daejeon (KR); Ju Yong Seo, Daejeon (KR); Jun Man Choi, Daejeon (KR); Woo Yeon Kim, Daejeon (KR); Jae Sung Hong, Daejeon (KR); Jang Soon Kim, Daejeon (KR); Sle Lee, Daejeon (KR); Kwang Su Seo, Daejeon (KR)

(73) Assignee: Koza Novel Materials Korea Co., Ltd.

( * ) Notice: Subject to any disclaimer, the term of this patent is extended or adjusted under 35 U.S.C. 154(b) by 276 days.

(21) Appl. No.: 16/614,167

(22) PCT Filed: May 18, 2018

(86) PCT No.: PCT/KR2018/005711
§ 371 (c)(1),
(2) Date: Nov. 15, 2019

(87) PCT Pub. No.: WO2018/216967
PCT Pub. Date: Nov. 29, 2018

(65) Prior Publication Data
US 2020/0172765 A1    Jun. 4, 2020

(30) Foreign Application Priority Data
May 22, 2017    (KR) .......................... 10-2017-0062845

(51) Int. Cl.
*C09J 7/38* (2018.01)
*C09J 7/50* (2018.01)
(Continued)

(52) U.S. Cl.
CPC ................ *C09J 7/385* (2018.01); *C09J 7/50* (2018.01); *C09J 133/08* (2013.01); *B32B 7/12* (2013.01);
(Continued)

(58) Field of Classification Search
CPC ....... B32B 7/12; B32B 37/12; B32B 2405/00; B32B 2457/20; B32B 2457/202;
(Continued)

(56) References Cited

U.S. PATENT DOCUMENTS 5,836,618 A * 11/1998 Perlman .................... G09F 3/04
283/70
2011/0104483 A1    5/2011 Shinozaki et al.
(Continued)

FOREIGN PATENT DOCUMENTS

CN    105001825 A      10/2015
CN    107216819 A *    9/2017 ................ C09J 7/00
(Continued)

OTHER PUBLICATIONS

International Search Report From PCT/KR2018/005711 dated Sep. 27, 2018.

*Primary Examiner* — Eli D. Strah
(74) *Attorney, Agent, or Firm* — Lerner, David, Littenberg, Krumholz & Mentlik, LLP

(57) ABSTRACT

A multilayer adhesive tape in which an interface separation between layers does not occur even at in extremely low temperature atmosphere is provided. The multilayer adhesive tape sequentially includes: a first outer adhesive layer; an intermediate adhesive layer; and a second outer adhesive layer, in which attaching force among the first outer adhesive layer, the intermediate adhesive layer, and the second outer adhesive layer is maintained after the multilayer adhesive tape is treated in liquefied nitrogen for 15 seconds.

14 Claims, 1 Drawing Sheet

(51) Int. Cl.
*C09J 133/08* (2006.01)
*B32B 37/12* (2006.01)
*B32B 7/12* (2006.01)

(52) U.S. Cl.
CPC ............ *B32B 37/12* (2013.01); *B32B 2405/00* (2013.01); *B32B 2457/20* (2013.01); *B32B 2457/202* (2013.01); *C09J 2433/00* (2013.01); *C09K 2323/05* (2020.08); *C09K 2323/057* (2020.08)

(58) Field of Classification Search
CPC ......... C09J 7/00; C09J 7/10; C09J 7/20; C09J 7/385; C09J 7/50; C09J 133/066; C09J 133/08; C09J 133/26; C09J 2203/318; C09J 2301/208; C09J 2433/00; C09K 2323/05; C09K 2323/057
See application file for complete search history.

(56) References Cited

U.S. PATENT DOCUMENTS

| | | | |
|---|---|---|---|
| 2013/0029147 A1 | 1/2013 | Miki et al. | |
| 2015/0044423 A1* | 2/2015 | Niimi | G02F 1/1339 |
| | | | 428/161 |
| 2015/0247064 A1 | 9/2015 | Kato et al. | |
| 2017/0121562 A1* | 5/2017 | Wang | B32B 27/22 |
| 2017/0253771 A1 | 9/2017 | Lee et al. | |

FOREIGN PATENT DOCUMENTS

| | | | | |
|---|---|---|---|---|
| EP | 0305161 A2 | 3/1989 | | |
| EP | 2495293 A1 | 9/2012 | | |
| JP | H01121386 A | 5/1989 | | |
| JP | H06346033 A | 12/1994 | | |
| JP | H09104777 A | 4/1997 | | |
| JP | 2009013361 A * | 1/2009 | | |
| JP | 2009013361 A | 1/2009 | | |
| JP | 2010007023 A | 1/2010 | | |
| JP | 2011093959 A | 5/2011 | | |
| JP | 2012188479 A | 10/2012 | | |
| JP | 6030316 B2 | 11/2016 | | |
| JP | 201775281 A | 4/2017 | | |
| KR | 100669134 B1 | 1/2007 | | |
| KR | 20130014360 A | 2/2013 | | |
| KR | 20140063625 A | 5/2014 | | |
| KR | 2015-0065684 A | 6/2015 | | |
| KR | 20160010545 A | 1/2016 | | |
| KR | 20160025050 A | 3/2016 | | |
| KR | 20160083583 A | 7/2016 | | |
| KR | 20170045117 A | 4/2017 | | |
| KR | 20170045117 A * | 4/2017 | ............ | C08F 220/14 |
| WO | 2013108565 A1 | 7/2013 | | |
| WO | 2016024729 A1 | 2/2016 | | |
| WO | 2016039521 A1 | 3/2016 | | |

* cited by examiner

[Figure 1]
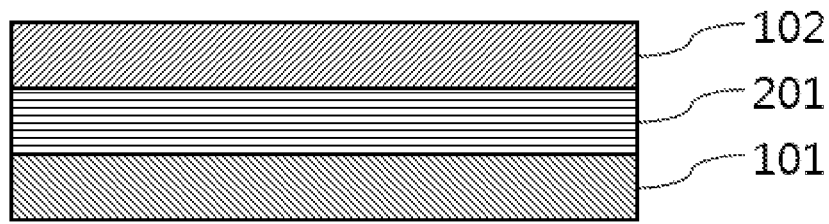
[Figure 2]
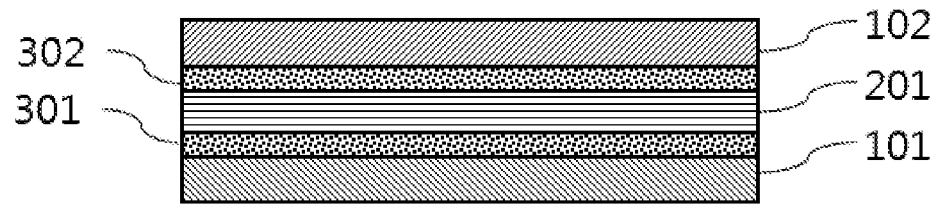

MULTI-LAYER ADHESIVE TAPE

CROSS-REFERENCE TO RELATED APPLICATIONS

This application is a national phase entry under 35 U.S.C. § 371 of International Application No. PCT/KR2018/005711, filed May 18, 2018, which claims priority to Korean Patent Application No. 10-2017-0062845, filed May 22, 2017.

TECHNICAL FIELD

Provided is a multilayer adhesive tape.

BACKGROUND ART

Various members are attached to an electronic device by an adhesive agent. For example, various optical members such as a polarizing plate, a phase difference plate, an optical compensation film, a reflection sheet, a protection film, and a brightness-enhancing film may be attached to a liquid crystal display (LCD) by an adhesive tape. Recently, as the performance of devices using an adhesive tape has been improved, physical properties required for the adhesive tape have also become gradually tricky. Specifically, excellent durability according to a high temperature fluctuation and semi-permanent adhesive performance have also been required in some cases. Furthermore, reworkability in which the residue does not remain when an adhesive tape is removed for reconstruction is required in some cases. As described above, there is a need for continuous studies for an adhesive tape suitable for the improved requirements.

REFERENCES OF THE RELATED ART

Patent Document

Korean Patent Application Laid-Open No. KR 10-2016-0025050 A

DETAILED DESCRIPTION OF THE INVENTION

Technical Problem

Provided is a multilayer adhesive tape in which an interface separation between layers does not occur even in an extremely low temperature atmosphere.

Technical Solution

An exemplary embodiment provides a multilayer adhesive tape sequentially including: a first outer adhesive layer; an intermediate adhesive layer; and a second outer adhesive layer, in which attaching force among the first outer adhesive layer, the intermediate adhesive layer, and the second outer adhesive layer is maintained after the multilayer adhesive tape is treated in liquefied nitrogen for 15 seconds.

Advantageous Effects

A multilayer adhesive tape according to an exemplary embodiment may implement excellent durability because interface separation between layers does not occur even in an extremely low temperature atmosphere.

The multilayer adhesive tape according to an exemplary embodiment may significantly improve durability of a device to which the multilayer adhesive tape is applied because deterioration in performance is minimized even in an atmosphere in which a temperature fluctuation is significant.

The multilayer adhesive tape according to an exemplary embodiment exhibits high step coverage, and simultaneously, has high reworkability.

The multilayer adhesive tape according to an exemplary embodiment can be prepared by a simple method, thereby promoting a reduction in preparation costs.

The multilayer adhesive tape according to an exemplary embodiment has high punchability, thereby minimizing errors at the time of cutting the multilayer adhesive tape.

BRIEF DESCRIPTION OF DRAWINGS

FIG. 1 is a schematic view of a lamination structure of a multilayer adhesive tape according to an exemplary embodiment.

FIG. 2 is a schematic view of a lamination structure of a multilayer adhesive tape according to an exemplary embodiment.

BEST MODE

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

In the present specification, the term "monomer polymerization unit" means a form in which the monomer forms a skeleton of the polymer, for example, a main chain or a side chain by being subjected to a polymerization reaction.

In the present specification, the unit "parts by weight" means a ratio of the weights between the respective components.

Hereinafter, the present specification will be described in more detail.

An exemplary embodiment provides a multilayer adhesive tape sequentially including: a first outer adhesive layer; an intermediate adhesive layer; and a second outer adhesive layer, in which attaching force among the first outer adhesive layer, the intermediate adhesive layer, and the second outer adhesive layer is maintained after the multilayer adhesive tape is treated in liquefied nitrogen for 15 seconds.

FIG. 1 is a schematic view of a lamination structure of a multilayer adhesive tape according to an exemplary embodiment. Specifically, FIG. 1 is a schematic view of a lamination structure of a multilayer adhesive tape in which a first outer adhesive layer 101, an intermediate adhesive layer 201, and a second outer adhesive layer 102 are sequentially laminated.

After the multilayer adhesive tape is treated in liquefied nitrogen for 15 seconds, an interface separation phenomenon between layers does not occur. That is, attaching force among the first outer adhesive layer, the intermediate adhesive layer, and the second outer adhesive layer is maintained even after the multilayer adhesive tape is treated in liquefied nitrogen for 15 seconds.

In the case of a general multilayer adhesive tape, the respective adhesive layers are prepared, and then the adhesive layers are attached to each other by compressing the adhesive layers or using a separate bonding agent. Accordingly, interface separation between layers occurs in an extremely low temperature atmosphere or an atmosphere where the temperature fluctuation is severe, so that there is a problem in that the general multilayer adhesive tape fails to perform a function as a multilayer adhesive tape. In contrast, an interface separation phenomenon between layers does not occur in the multilayer adhesive tape according to an exemplary embodiment even in an extremely low temperature atmosphere. Therefore, the multilayer adhesive tape according to an exemplary embodiment has an advantage in that the problems of the multilayer adhesive tape in the related art are solved.

In the multilayer adhesive tape, a separate bonding agent may not be used in order to attach the first outer adhesive layer, the intermediate adhesive layer, and the second outer adhesive layer.

The multilayer adhesive tape may further include: a first interface mixture layer provided between the first outer adhesive layer and the intermediate adhesive layer; and a second interface mixture layer provided between the second outer adhesive layer and the intermediate adhesive layer. Specifically, the first interface mixture layer may include both a material constituting the first outer adhesive layer and a material constituting the intermediate adhesive layer, and the second interface mixture layer may include both a material constituting the second outer adhesive layer and a material constituting the intermediate adhesive layer.

FIG. 2 is a schematic view of a lamination structure of a multilayer adhesive tape according to an exemplary embodiment. Specifically, FIG. 2 is a schematic view of a lamination structure of a multilayer adhesive tape in which a first interface mixture layer 301 is provided between the first outer adhesive layer 101 and the intermediate adhesive layer 201, and a second interface mixture layer 302 is provided between the intermediate adhesive layer 201 and the second outer adhesive layer 102.

The multilayer adhesive tape may be prepared by sequentially laminating a first outer adhesive composition, an intermediate adhesive composition, and a second outer adhesive composition, and then simultaneously curing, specifically, photo-curing the compositions.

The first outer adhesive composition may constitute the first outer adhesive layer after curing, the intermediate adhesive composition may constitute the intermediate adhesive layer after curing, and the second outer adhesive composition may constitute the second outer adhesive layer after curing. Specifically, the multilayer adhesive tape is prepared by a method of laminating liquid-phase compositions, and then simultaneously curing the compositions instead of a method of separately preparing the respective layers, and then bonding the layers. Therefore, a liquid mixing interval may occur among the respective layers of the multilayer adhesive tape. The multilayer adhesive tape may secure excellent interlayer attaching force by the liquid mixing interval as described above, as compared to the general multilayer adhesive tape. Further, the multilayer adhesive tape may prevent an interface separation phenomenon between layers by the liquid mixing interval even in an extremely low temperature environment.

An interface layer caused by liquid mixing may be present at each of the interface between the first outer adhesive composition and the intermediate adhesive composition and the interface between the intermediate adhesive composition and the second outer adhesive composition. Specifically, the interface layer caused by liquid mixing at the interface between the first outer adhesive composition and the intermediate adhesive composition may constitute the first interface mixture layer after curing. Further, the interface layer caused by liquid mixing at the interface between the intermediate adhesive composition and the second outer adhesive composition may constitute the second interface mixture layer after curing.

The first outer adhesive composition, the intermediate adhesive composition, and the second outer adhesive composition may be sequentially applied onto a substrate. In addition, the first outer adhesive composition, the intermediate adhesive composition, and the second outer adhesive composition may be simultaneously and sequentially applied onto a substrate. As a method of applying the adhesive composition, a method generally used in the art, such as slot die and lip die, may be used.

In the present specification, the glass transition temperature (Tg) was measured by increasing the temperature at a heating rate of 5° C./min within a temperature range of −70° C. to 100° C. using a differential scanning calorimeter (DSC) (Q-1000, TA Instrument Inc.). In this case, the glass transition temperature was decided as the midpoint of the DSC curve.

The glass transition temperature of the intermediate adhesive layer may be −40° C. or more and 0° C. or less, −40° C. or more and −15° C. or less, −40° C. or more and −20° C. or less, or −35° C. or more and −25° C. or less. When the glass transition temperature of the intermediate adhesive layer satisfies the above range, punchability of the multilayer adhesive tape may be improved. In addition, when the glass transition temperature of the intermediate adhesive layer satisfies the above range, the multilayer adhesive tape may be easily handled. Furthermore, when the glass transition temperature of the intermediate adhesive layer satisfies the above range, step coverage of the multilayer adhesive tape may be more improved.

Each of the glass transition temperatures of the first outer adhesive layer and the second outer adhesive layer may be −60° C. or more and −20° C. or less, −60° C. or more and −30° C. or less, −60° C. or more and −40° C. or less, or −55° C. or more and −45° C. or less. When the glass transition temperature of each of the first outer adhesive layer and the second outer adhesive layer satisfies the above range, the multilayer adhesive tape may implement excellent step coverage, and may minimize deterioration in punchability.

The glass transition temperature of the intermediate adhesive layer may be higher than the glass transition temperature of each of the first outer adhesive layer and the second outer adhesive layer. The intermediate adhesive layer having a relatively high glass transition temperature may have higher tensile force than each of the first outer adhesive layer and the second outer adhesive layer. Through the intermediate adhesive layer having a relatively high glass transition temperature and high tensile force, the multilayer adhesive tape is not cut off well when the multilayer adhesive tape is attached to an adherend, and then removed for reconstruction. Therefore, the multilayer adhesive tape has an advantage in that the multilayer adhesive tape is easily removed. That is, the intermediate adhesive layer may serve to improve reworkability of the multilayer adhesive tape. Furthermore, the first outer adhesive layer and the second outer adhesive layer have a low glass transition temperature and thus may implement high step coverage. Specifically, the first outer adhesive layer and the second outer adhesive layer may implement high fluidity due to the low glass transition temperature, thereby leading to effectively embed a stepped part.

The difference between the glass transition temperature of each of the first outer adhesive layer and the second outer adhesive layer and the glass transition temperature of the intermediate adhesive layer may be 5° C. or more and 40° C. or less, specifically, 5° C. or more and 25° C. or less.

Since the multilayer adhesive tape includes the adhesive layers having different physical properties, the multilayer adhesive tape may implement both high step coverage and excellent reworkability. In particular, when the difference in glass transition temperature between each of the first outer adhesive layer and the second outer adhesive layer and the intermediate adhesive layer satisfies the above range, the multilayer adhesive tape may exhibit the optimum performance.

A thickness ratio of the first outer adhesive layer to the intermediate adhesive layer and a thickness ratio of the second outer adhesive layer to the intermediate adhesive layer may be each 1:0.5 to 1:2, specifically, 1:0.8 to 1:1.4. When the thickness ratio of the intermediate adhesive layer to each of the first outer adhesive layer and the second outer adhesive layer is within the above range, the multilayer adhesive tape may secure excellent step coverage, and simultaneously, may implement excellent reworkability.

The intermediate adhesive layer may have a thickness of 30 μm or more and 100 μm or less, 50 μm or more and 100 μm or less, 50 μm or more and 80 μm or less, or 60 μm or more and 80 μm or less. When the thickness of the intermediate adhesive layer is within the above range, the multilayer adhesive tape may show appropriate hardness, and accordingly, the multilayer adhesive tape may have excellent reworkability and step coverage. Further, when the thickness of the intermediate adhesive layer is within the above range, it is possible to prevent a phenomenon in which the intermediate adhesive layer itself is separated in an extremely low temperature environment. In addition, when the above thickness range of the intermediate adhesive layer and the above thickness ratio range of each of the first outer adhesive layer and the second outer adhesive layer to the intermediate adhesive layer are maintained, the multilayer adhesive tape may implement both excellent step coverage and excellent reworkability.

The first outer adhesive layer and the second outer adhesive layer may each have a thickness of 25 μm or more and 200 μm or less, specifically, 45 μm or more and 120 μm or less. When the thicknesses of the first outer adhesive layer and the second outer adhesive layer are within the above range, the multilayer adhesive tape may simultaneously implement excellent step coverage, reworkability, and long-term durability. Further, when the thicknesses of the first outer adhesive layer and the second outer adhesive layer are within the above range, the first outer adhesive layer and the second outer adhesive layer may not be separated from the multilayer adhesive tape, and may maintain the shapes thereof even in an extremely low temperature environment.

The total thickness of the multilayer adhesive tape may be 100 μm or more and 250 μm or less, 100 μm or more and 200 μm or less, or 120 μm or more and 170 μm or less. When the total thickness of the multilayer adhesive tape is within the above range, the multilayer adhesive tape may have high adhesiveness, step absorbability, and reworkability in spite of a relatively thin thickness.

The first outer adhesive layer and the second outer adhesive layer may be formed by using the same adhesive composition. Furthermore, the thicknesses of the first outer adhesive layer and the second outer adhesive layer may be the same as each other.

The thickness of the intermediate adhesive layer may be the shortest distance from the center of the first interface mixture layer to the center of the second interface mixture layer. In addition, the thickness of the first outer adhesive layer may be the shortest distance from the center of the first interface mixture layer to the outer side surface of the first outer adhesive layer. Furthermore, the thickness of the second outer adhesive layer may be the shortest distance from the center of the second interface mixture layer to the outer side surface of the second outer adhesive layer.

The intermediate adhesive layer may include an intermediate adhesive polymer including: a polymerization unit of an alkyl group-containing (meth)acrylate monomer; a polymerization unit of a cycloalkyl group-containing (meth)acrylate monomer; and a polymerization unit of a polar functional group-containing monomer.

In the intermediate adhesive polymer, the content of the polymerization unit of the alkyl group-containing (meth)acrylate monomer may be 30 parts by weight or more and 90 parts by weight or less, 50 parts by weight or more and 85 parts by weight or less, or 60 parts by weight or more and 85 parts by weight or less, based on 100 parts by weight of the intermediate adhesive polymer.

In the intermediate adhesive polymer, the content of the polymerization unit of the cycloalkyl group-containing (meth)acrylate monomer may be more than 0 part by weight and 30 parts by weight or less based on 100 parts by weight of the intermediate adhesive polymer. When the content of the polymerization unit of the cycloalkyl group-containing (meth)acrylate monomer is within the above range, the multilayer adhesive tape may have appropriate attaching force with respect to an adherend, high step coverage, and improved reworkability. Specifically, when the content of the polymerization unit of the cycloalkyl group-containing (meth)acrylate monomer is within the above range, the multilayer adhesive tape may maintain appropriate strength and thus may be easily removed when reconstruction is needed. Furthermore, within the above content range, the intermediate adhesive composition may be easily applied and cured. Further, within the above content range, the generation of delayed bubbles in the intermediate adhesive layer may be minimized.

In the intermediate adhesive polymer, the content of the polymerization unit of the polar functional group-containing monomer may be 5 parts by weight or more and 20 parts by weight or less based on 100 parts by weight of the intermediate adhesive polymer. When the content of the polymerization unit of the polar functional group-containing monomer is within the above range, the multilayer adhesive tape may have both reworkability and step coverage at appropriate levels. In addition, within the above content range, the intermediate adhesive layer may secure appropriate cohesive force. Accordingly, it is possible to effectively improve step coverage and die cutting performance (punchability) of the multilayer adhesive tape and to minimize an amount of delayed bubbles generated over a period of time after the multilayer adhesive tape is adhered to a subject.

The first outer adhesive layer and the second outer adhesive layer may each independently include an outer adhesive polymer including: a polymerization unit of an alkyl group-containing (meth)acrylate monomer; and a polymerization unit of a polar functional group-containing monomer.

In the outer adhesive polymer, the content of the polymerization unit of the alkyl group-containing (meth)acrylate monomer may be 50 parts by weight or more and 95 parts by weight or less, 60 parts by weight or more and 90 parts by weight or less, or 80 parts by weight or more and 90 parts by weight or less, based on 100 parts by weight of the outer adhesive polymer.

In the outer adhesive polymer, the content of the polymerization unit of the polar functional group-containing monomer may be more than 0 part by weight and 20 parts by weight or less, more than 0 part by weight and 10 parts by weight or less, more than 0 part by weight and 5 parts by weight or less, 1 part by weight or more and 10 parts by weight or less, or 1 part by weight or more and 5 parts by weight or less, based on 100 parts by weight of the outer adhesive polymer. In the outer adhesive layer, when the content of the polymerization unit of the polar functional group-containing monomer is within the above range, the multilayer adhesive tape may have both appropriate attaching force and step coverage. Furthermore, it is possible to effectively improve step coverage and die cutting performance of the multilayer adhesive tape and to minimize an amount of delayed bubbles generated over a period of time after the multilayer adhesive tape is adhered to a subject.

The outer adhesive polymer may further include a polymerization unit of a heterocycloalkyl group-containing (meth)acrylate monomer.

The heterocycloalkyl group may include a ring structure in which an unsaturated bond is not present and a heteroatom other than carbon is included in the functional group. Furthermore, the heterocycloalkyl group may include a structure in which one or more carbon atoms are substituted with a heteroatom in a structure of a monocyclic ring or a polycyclic ring having 3 to 20 carbon atoms.

The heterocycloalkyl group-containing (meth)acrylate monomer may be one or more selected from the group consisting of tetrahydrofurfuryl acrylate (THFA), tetrahydrofurfuryl methacrylate, tetrahydropyranyl acrylate (THPA), acryloyl morpholine, and cyclictrimethylol-propaneformalacrylate (CTFA), but is not limited thereto.

The content of the polymerization unit of the heterocycloalkyl group-containing (meth)acrylate monomer may be 1 part by weight or more and 15 parts by weight or less, specifically, 5 parts by weight or more and 15 parts by weight or less, based on 100 parts by weight of the outer adhesive polymer. When the content of the polymerization unit of the heterocycloalkyl group-containing (meth)acrylate monomer is within the above range, the first outer adhesive layer and the second outer adhesive layer may have a low glass transition temperature (Tg). Accordingly, the first outer adhesive layer and the second outer adhesive layer may have excellent adhesive force and improved wettability.

The intermediate adhesive polymer may be formed by solution-polymerizing a composition including an alkyl group-containing (meth)acrylate monomer, a cycloalkyl group-containing (meth)acrylate monomer, and a polar functional group-containing monomer. Specifically, the intermediate adhesive polymer may be formed by polymerizing the monomers via the thermal polymerization and/or photopolymerization of the composition.

Further, each of the outer adhesive polymer may be formed by solution-polymerizing a composition including an alkyl group-containing (meth)acrylate monomer and a polar functional group-containing monomer. Specifically, the outer adhesive polymer may be formed by polymerizing the monomers via the thermal polymerization and/or photopolymerization of the composition.

Each of the intermediate adhesive polymer, the outer adhesive polymer may further include an additional material, such as a crosslinking agent, an initiator, and a tackifier, generally used in the art, if necessary.

In the present specification, the "(meth)acrylate" means "acrylate" or "methacrylate".

The cycloalkyl group may include a carbon ring structure in which an unsaturated bond is not present in a functional group. Furthermore, the cycloalkyl group may include a monocyclic ring or a polycyclic ring having 3 to 20 carbon atoms.

The alkyl group-containing (meth)acrylate monomer may be a (meth)acrylate having an alkyl group having 1 to 20 carbon atoms. Specifically, the alkyl group-containing (meth)acrylate monomer may be one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-methylhexyl (meth)acrylate, 2-ethylbutyl (meth)acrylate, n-octyl (meth)acrylate, and isooctyl (meth)acrylate, but is not limited thereto.

The cycloalkyl group-containing (meth)acrylate monomer may be one or more selected from the group consisting of cyclohexyl acrylate (CHA), cyclohexyl methacrylate (CHMA), isobornyl acrylate (IBOA), isobornyl methacrylate (IBOMA), and 3,3,5-trimethylcyclohexylacrylate (TM-CHA), but is not limited thereto.

The polar functional group-containing monomer may include one or more selected from the group consisting of a hydroxyl group-containing monomer, a carboxyl group-containing monomer, and a nitrogen-containing monomer.

The hydroxyl group-containing monomer may be one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, and 2-hydroxypropyleneglycol (meth)acrylate, but is not limited thereto.

The carboxyl group-containing monomer may be one or more selected from the group consisting of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyric acid, an acrylic acid dimer, itaconic acid, and maleic acid, but is not limited thereto.

The nitrogen-containing monomer may be one or more selected from the group consisting of 2-isocyanatoethyl (meth)acrylate, 3-isocyanatopropyl (meth)acrylate, 4-isocyanatobutyl (meth)acrylate, (meth)acrylamide, N-vinylpyrrolidone, dimethylacrylamide, and N-vinylcaprolactam, but is not limited thereto.

The multilayer adhesive tape may be used for attaching various optical members such as a polarizing plate, a phase difference plate, an optical compensation film, a reflection sheet, a protection film, and a brightness-enhancing film. However, the use of the multilayer adhesive tape is not limited thereto, and the multilayer adhesive tape may be used without limitation for the use capable of being used in the art.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

[Preparation of Intermediate Adhesive Composition]

An intermediate adhesive composition including 75 parts by weight of 2-methylhexyl acrylate, 10 parts by weight of isobornyl methacrylate, 10 parts by weight of acrylic acid, 5 parts by weight of 2-hydroxyethyl acrylate, and 5 parts by weight of dimethylacrylamide was prepared.

[Preparation of Outer Adhesive Composition]

An outer adhesive composition including 88 parts by weight of 2-ethylhexyl acrylate, 10 parts by weight of tetrahydrofurfuryl methacrylate, and 2 parts by weight of acrylic acid was prepared.

EXAMPLES

The prepared intermediate adhesive composition and the prepared outer adhesive composition were simultaneously coated to laminate the outer adhesive composition, the intermediate adhesive composition, and the outer adhesive composition, and then the compositions were UV-cured by using black light, thereby preparing a multilayer adhesive tape sequentially including a first outer adhesive layer, an intermediate adhesive layer, and a second outer adhesive layer. The thickness of each layer of the multilayer adhesive tapes prepared according to the Examples is as in the following Table 1.

Furthermore, the step coverage, the punchability, the presence and absence of an interface separation phenomenon at an extremely low temperature, the presence and absence of an interface separation phenomenon at a high temperature, and the like with respect to each of the multilayer adhesive tapes prepared by the Examples are shown in the following Table 1.

TABLE 1

|  | Thickness (μm) of intermediate adhesive layer (M) | Thicknesses (μm) of first and second outer adhesive layers (O) | M/O | Step coverage | Punchability | Interface separation at extremely low temperature | Interface separation at high temperature |
|---|---|---|---|---|---|---|---|
| Example 1 | 50 | 75 | 0.67 | ooo | xxx | Not separated | Not separated |
| Example 2 | 55 | 72.5 | 0.76 | ooo | x | Not separated | Not separated |
| Example 3 | 60 | 70 | 0.86 | oo | o | Not separated | Not separated |
| Example 4 | 65 | 67.5 | 0.96 | oo | oo | Not separated | Not separated |
| Example 5 | 70 | 65 | 1.08 | o | oo | Not separated | Not separated |
| Example 6 | 75 | 62.5 | 1.2 | o | ooo | Not separated | Not separated |
| Example 7 | 80 | 60 | 1.33 | o | ooo | Not separated | Not separated |
| Example 8 | 85 | 57.5 | 1.48 | x | ooo | Not separated | Not separated |
| Example 9 | 90 | 55 | 1.64 | x | ooo | Not separated | Not separated |
| Example 10 | 100 | 50 | 2 | x | ooo | Not separated | Not separated |

Comparative Examples

An intermediate adhesive layer was prepared by UV curing the prepared intermediate adhesive composition using black light, and first and second outer adhesive layers were prepared by UV curing the prepared outer adhesive composition using black light. Next, a multilayer adhesive tape was prepared by a joining method of laminating the first outer adhesive layer, the intermediate adhesive layer, and the second outer adhesive layer in this order, and then joining these layers. The thickness of each layer of the multilayer adhesive tapes prepared according to the Comparative Examples is as in the following Table 2.

TABLE 2

|  | Thickness (μm) of intermediate adhesive layer (M) | Thicknesses (μm) of first and second outer adhesive layers (O) | M/O | Step coverage | Punchability | Interface separation at extremely low temperature | Interface separation at high temperature |
|---|---|---|---|---|---|---|---|
| Comparative Example 1 | 50 | 75 | 0.67 | ooo | xxx | Separated | Separated |
| Comparative Example 2 | 55 | 72.5 | 0.76 | ooo | xxx | Separated | Separated |
| Comparative Example 3 | 60 | 70 | 0.86 | ooo | xxx | Separated | Separated |
| Comparative Example 4 | 65 | 67.5 | 0.96 | ooo | xxx | Separated | Separated |
| Comparative Example 5 | 70 | 65 | 1.08 | oo | xxx | Separated | Separated |
| Comparative Example 6 | 75 | 62.5 | 1.2 | oo | xx | Separated | Separated |
| Comparative Example 7 | 80 | 60 | 1.33 | oo | xx | Separated | Separated |
| Comparative Example 8 | 85 | 57.5 | 1.48 | o | x | Separated | Separated |
| Comparative Example 9 | 90 | 55 | 1.64 | o | o | Separated | Separated |

TABLE 2-continued

|  | Thickness (μm) of intermediate adhesive layer (M) | Thicknesses (μm) of first and second outer adhesive layers (O) | M/O | Step coverage | Punchability | Interface separation at extremely low temperature | Interface separation at high temperature |
|---|---|---|---|---|---|---|---|
| Comparative Example 10 | 100 | 50 | 2 | x | oo | Separated | Separated |

Evaluation of Step Coverage Performance

The performance of overcoming the step was evaluated by the number of steps embedded, which was measured by using a step coupon. The prepared multilayer adhesive tape was laminated on a glass substrate including a printing layer with a step of 40 μm and having a thickness of 0.55 T, a glass substrate having a thickness of 1 T was joined on the multilayer adhesive tape, the laminate was autoclaved under conditions of 40° C. and 4 bar for 20 minutes, and then the number of delayed bubbles produced as a result of the failure to sufficiently overcome the step was measured, and the case where the number of delayed bubbles is 1 or less, the case where the number of delayed bubbles is 2, the case where the number of delayed bubbles is 3, and the case where the number of delayed bubbles is 4 were denoted as "ooo", "oo", "o", and "x", respectively.

Evaluation of Die Cutting (Punchability) Performance

It was measured whether a residue occurred at a blade portion and a cutting portion when the prepared multilayer adhesive tape was cut by using a Thomson cutting machine. Specifically, the case where the multilayer adhesive tape stuck on one of the four surfaces of the blade, the case where the multilayer adhesive tape stuck on two of the four surfaces of the blade, and the case where the multilayer adhesive tape stuck on three or more of the four surfaces of the blade, the case where the multilayer adhesive tape was reattached to the multilayer adhesive tape remaining on the side while the multilayer adhesive tape did not stick on the blade at all, and as a result, the burr was not removed from the two surfaces of the blade, the case where the multilayer adhesive tape was reattached to the multilayer adhesive tape remaining on the side, and as a result, the burr was not removed from the one surface of the blade, and the case where the burr was easily removed while the multilayer adhesive tape was not reattached to the multilayer adhesive tape remaining on the side were denoted as "x", "xx", "xxx", "o", "oo", and "ooo", respectively.

Evaluation of Interface Separation at Extremely Low Temperature

A release liner was attached onto both surfaces of the prepared multilayer adhesive tape, and a sample with a size of 5 cm×5 cm was produced. Next, after the prepared sample was immersed in liquefied nitrogen for 15 seconds and taken out, cracks were generated on the sample by adding pressure to the sample. After the release liner was peeled off, the multilayer adhesive tape was attached onto a 90 degree jig, and it was confirmed whether the interface between the intermediate adhesive layer and the outer adhesive layer was separated by verifying the cross section of the multilayer adhesive tape.

Evaluation of Interface Separation at High Temperature

After stainless steel substrates was attached onto both surfaces of the multilayer adhesive tape, a 1 kg to 5 kg weight hung on the stainless steel substrate at one side, the stainless steel substrate at the other side was hung on a jig, and the assembly was left to stand in an oven at 80° C. for 24 hours, thereby confirming whether the interface between the intermediate adhesive layer and the outer adhesive layer was separated.

According to the results in Tables 1 and 2, it can be seen that in the multilayer adhesive tape according to the present exemplary embodiment, the interface separation between the layers does not occur even at an extremely low temperature and a high temperature. In contrast, it can be seen that in the multilayer adhesive tapes according to the Comparative Examples which is prepared by a joining method, the interface separation between the layers occurs at an extremely low temperature and a high temperature.

Furthermore, according to Table 1, it could be confirmed that when the ratio (M/O) of the intermediate adhesive layer to the outer adhesive layer was within 0.8 to 1.4, the prepared multilayer adhesive tape satisfied both step coverage and punchability. Further, it could be confirmed that it was also possible to prevent the interface separation phenomenon at an extremely low temperature and a high temperature.

EXPLANATION OF REFERENCE NUMERALS AND SYMBOLS

101: First outer adhesive layer
102: Second outer adhesive layer
201: Intermediate adhesive layer
301: First interface mixture layer
302: Second interface mixture layer

The invention claimed is:

1. A multilayer adhesive tape sequentially comprising:
   a first outer adhesive layer;
   an intermediate adhesive layer;
   a second outer adhesive layer;
   a first interface mixture layer provided between the first outer adhesive layer and the intermediate adhesive layer; and
   a second interface mixture layer provided between the second outer adhesive layer and the intermediate adhesive layer,
   wherein attaching force among the first outer adhesive layer, the intermediate adhesive layer, and the second outer adhesive layer is maintained after the multilayer adhesive tape is treated in liquefied nitrogen for 15 seconds,
   wherein a thickness ratio of the first outer adhesive layer to the intermediate adhesive layer and a thickness ratio of the second outer adhesive layer to the intermediate adhesive layer are each 1:0.8 to 1:1.4, and
   wherein the multilayer adhesive tape is prepared by sequentially laminating a first outer adhesive composition, an intermediate adhesive composition, and a second outer adhesive composition, and
   then simultaneously curing the first outer adhesive composition, the intermediate adhesive composition, and the second outer adhesive composition, wherein the first interface mixture layer is prepared by liquid mixing at an interface between the first outer adhesive composition and the intermediate adhesive composition and the second interface mixture layer is prepared by liquid mixing an interface between the intermediate adhesive composition and the second outer adhesive composition, wherein the intermediate adhesive layer comprises an intermediate adhesive polymer comprising: a polymerization unit of an alkyl group-containing (meth)acrylate monomer; a polymerization unit of a cycloalkyl group-containing (meth)acrylate monomer; and a polymerization unit of a polar functional group-containing monomer, and wherein the first outer adhesive layer and the second outer adhesive layer each independently comprise an outer adhesive polymer comprising: a polymerization unit of an alkyl group-containing (meth)acrylate monomer; and a polymerization unit of a polar functional group-containing monomer.

2. The multilayer adhesive tape of claim 1, wherein the first interface mixture layer comprises both a material constituting the first outer adhesive layer and a material constituting the intermediate adhesive layer, and the second interface mixture layer comprises both a material constituting the second outer adhesive layer and a material constituting the intermediate adhesive layer.

3. The multilayer adhesive tape of claim 1, wherein a glass transition temperature of the intermediate adhesive layer is higher than glass transition temperatures of the first outer adhesive layer and the second outer adhesive layer, and
a difference between the glass transition temperature of each of the first outer adhesive layer and the second outer adhesive layer and the glass transition temperature of the intermediate adhesive layer is 5° C. or more and 40° C. or less.

4. The multilayer adhesive tape of claim 1, wherein the intermediate adhesive layer has a thickness of 30 μm or more and 100 μm or less.

5. The multilayer adhesive tape of claim 1, wherein a content of the polymerization unit of the cycloalkyl group-containing (meth)acrylate monomer is more than 0 part by weight and 30 parts by weight or less based on 100 parts by weight of the intermediate adhesive polymer.

6. The multilayer adhesive tape of claim 1, wherein a content of the polymerization unit of the polar functional group-containing monomer is 5 part by weight or more and 20 parts by weight or less based on 100 parts by weight of the intermediate adhesive polymer.

7. The multilayer adhesive tape of claim 1, wherein a content of the polymerization unit of a polar functional group-containing monomer is more than 0 part by weight and 20 parts by weight or less based on 100 parts by weight of the outer adhesive polymer of at least one of the first outer adhesive layer or the second outer adhesive layer.

8. The multilayer adhesive tape of claim 1, wherein the outer adhesive polymer of at least one of the first outer adhesive layer or the second outer adhesive layer further comprises a polymerization unit of a heterocycloalkyl group-containing (meth)acrylate monomer.

9. The multilayer adhesive tape of claim 8, wherein the heterocycloalkyl group-containing (meth)acrylate monomer is one or more selected from the group consisting of tetrahydrofurfuryl acrylate (THFA), tetrahydrofurfuryl methacrylate, tetrahydropyranyl acrylate (THPA), acryloyl morpholine, and cyclictrimethylol-propaneformalacrylate (CTFA).

10. The multilayer adhesive layer of claim 8, wherein a content of the polymerization unit of the heterocycloalkyl group-containing (meth)acrylate monomer is 1 part by weight or more and 15 parts by weight or less based on 100 parts by weight of the outer adhesive polymer of at least one of the first outer adhesive layer or the second outer adhesive layer.

11. The multilayer adhesive tape of claim 1, wherein the alkyl group-containing (meth)acrylate monomer is one or more selected from the group consisting of methyl (meth)acrylate, ethyl (meth)acrylate, isobornyl methyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-methylhexyl (meth)acrylate, 2-ethylbutyl (meth)acrylate, n-octyl (meth)acrylate, and isooctyl (meth)acrylate.

12. The multilayer adhesive tape of claim 1, wherein the cycloalkyl group-containing (meth)acrylate monomer is one or more selected from the group consisting of cyclohexyl acrylate (CHA), cyclohexyl methacrylate (CHMA), isobornyl acrylate (IBOA), isobornyl methacrylate (IBOMA), isobornyl methyl(meth)acrylate, and 3,3,5-trimethylcyclohexylacrylate (TMCHA).

13. The multilayer adhesive tape of claim 1, wherein the polar functional group-containing monomer is one or more monomers selected from the group consisting of a hydroxyl group-containing monomer, a carboxyl group-containing monomer, and a nitrogen-containing monomer.

14. A method of preparing the multilayer adhesive tape of claim 1, comprising:
sequentially laminating a first outer adhesive composition, an intermediate adhesive composition, and a second outer adhesive composition, and
then simultaneously curing the first outer adhesive composition, the intermediate adhesive composition, and the second outer adhesive composition.

* * * * *